United States Patent [19]

Carlberg

[11] 4,080,418
[45] Mar. 21, 1978

[54] EXTRACTION OF COBALT, COPPER AND NICKEL VALUES FROM AMMONIACAL SOLUTIONS WITH CHELATING EXCHANGE RESINS OF RESTORED CAPACITY

[75] Inventor: John R. Carlberg, Arvada, Colo.

[73] Assignee: Amax Inc., Greenwich, Conn.

[21] Appl. No.: 770,820

[22] Filed: Feb. 22, 1977

[51] Int. Cl.$^2$ .................. C01G 3/00; C01G 53/00; C01G 51/00

[52] U.S. Cl. .................. 423/24; 423/139; 423/DIG. 14; 210/30 R; 260/2.2 R

[58] Field of Search .............. 423/24, 139, DIG. 14; 260/2.1 R, 2.1 E, 2.2 R; 210/30 R

[56] References Cited

U.S. PATENT DOCUMENTS

| | | | |
|---|---|---|---|
| 2,702,795 | 2/1955 | Gilwood | 260/2.1 |
| 2,888,441 | 5/1959 | Morris | 260/2.2 R |
| 2,993,782 | 7/1961 | Hampton et al. | 423/24 |

*Primary Examiner*—Edward J. Meros
*Assistant Examiner*—Brian E. Hearn
*Attorney, Agent, or Firm*—Michael A. Ciomek

[57] ABSTRACT

Cobalt, copper and nickel values are separated from ammoniacal aqueous solutions by contacting the solutions with a chelate exchange resin of polymerized ar-vinylbenzylamino dicarboxylic acids whereby the cobalt, copper and nickel values are loaded on the chelate exchange resin, stripping the cobalt, copper and nickel values from the loaded chelate exchange resin by contacting the loaded resin with a mineral acid and restoring the capacity of the chelate exchange resin when it falls below a predetermined value by reacting the degraded chelate exchange resin with an aqueous solution of a halo salt of a carboxylic acid, the aqueous solution being maintained at a pH value greater than about 8.

9 Claims, No Drawings

EXTRACTION OF COBALT, COPPER AND NICKEL VALUES FROM AMMONIACAL SOLUTIONS WITH CHELATING EXCHANGE RESINS OF RESTORED CAPACITY

BACKGROUND OF THE INVENTION

The present invention relates to a process for extracting cobalt, copper or nickel values from ammoniacal process solutions, and more particularly, to a process for extracting cobalt, copper or nickel values from ammoniacal solutions with a chelate exchange resin.

Processes for extracting metal values, including nickel and cobalt, from aqueous solutions with organic extractants are well known in the art. For example, there is disclosed in U.S. Pat. No. 2,993,782 to Hampton et al. a process for extracting cobalt, copper or nickel values from ammoniacal solutions with chelate exchange resins. The chelate exchange resin comprises a water-insoluble, water-swollen, solid polymeric resin containing recurring units of at least 80 percent by weight which correspond to an ar-vinylbenzylamino dicarboxylic acid. Metal values loaded on the chelate exchange resin are stripped therefrom by contact with an aqueous solution of a mineral acid. The stripped chelate exchange resin is treated with an aqueous solution of ammonium sulfate or ammonium chloride before being recycled to recover further quantities of the metal values.

Experience has shown that the class of organic extractants taught by Hampton et al. are gradually degraded. Actual use of iminodiacetate chelate exchange resins for periods over a year have shown that such resins can lose 30% or more of their loading capacities. Hampton et al. did not recognize this problem nor did they offer any solution.

BRIEF SUMMARY OF THE INVENTION

The present invention relates generally to a process for removing at least one metal value selected from the group consisting of cobalt, copper or nickel from ammoniacal process solutions. The process comprises contacting the ammoniacal solution with a water-insoluble, water-swollen, solid polymeric resin containing recurring units of at least 80 percent by weight of an ar-vinylbenzylamino dicarboxylic acid to load the metal values on the resin, stripping the metal value from the loaded resin with an aqueous solution of a mineral acid to produce a concentrated acidic solution of the metal value and to regenerate the resin, recycling the regenerated resin to load further quantities of the metal value on the resin, and contacting the stripped resin with an alkaline aqueous solution of at least one halo salt of at least one water-soluble carboxylic acid when the loading capacity of the resin falls below a predetermined value to restore the resin for continued use in the process.

DETAILED DESCRIPTION OF THE INVENTION

Ammoniacal solutions containing cobalt, copper or nickel, regardless of origin, can be treated by the process in accordance with the present invention. Cobalt-, copper- or nickel- containing ammoniacal solutions are commonly obtained in extraction of these metals from their ores and/or ore concentrates but the invention is not restricted thereto.

The cobalt, copper and nickel values in ammoniacal solutions are present as bivalent amine complex ions having the general formula $Co(NH_3)_x^{+2}$, $Cu(NH_3)_x^{+2}$, and $Ni(NH_3)_x^{+2}$, wherein $x$ is an integer value from 2 to 6. Ammoniacal solutions containing between about 0.01 and about 2 grams per liter (gpl) cobalt, between about 0.01 and 2 gpl copper, between about 0.01 and about 2 gpl nickel and having an ammoniacal pH value between 7 and 9 can be treated by the process in accordance with the present invention.

Ammoniacal solutions containing cobalt, copper or nickel are contacted with a chelate exchange resin to load the nickel, cobalt and copper values on the resin. The loaded resin is then treated with an aqueous solution of a mineral acid to strip the metal values thereby forming a concentrated aqueous solution of the metal values from which they can be separately recovered. The raffinate can then be treated to recover other metal values which do not form chelates with the chelate exchange resin or to recover ammonia or ammonium salts for recycling to the process.

Chelate exchange resins which can be employed to recover cobalt, copper and nickel values in ammoniacal solutions have a polymeric structure of recurring units of at least 80 percent by weight of at least one ar-vinylbenzylamino dicarboxylic acid which can be generally represented by the formula:

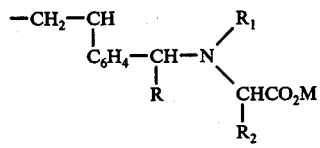

wherein one and only one of the symbols $R_1$ and $R_2$ represents the radical:

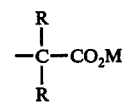

the other of the symbols $R_1$ and $R_2$ represents hydrogen or the methyl radical, and wherein the symbol R represents hydrogen or the methyl radical, and the symbol M represents a cation selected from the group consisting of hydrogen, alkali metals, alkaline earth metals, and ammonium and the other symbols have their customary meanings. Specific examples can be symbolically represented as follows:

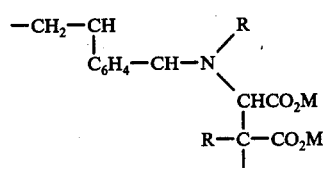

and

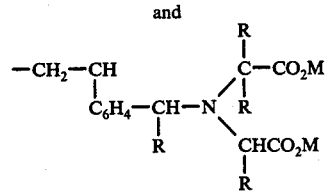

Examples of chelate resins that can be employed in accordance with the present invention include: N-(ar-vinylbenzyl) iminodiacetic acid, the polymers of N-(ar-vinylbenzyl)aspartic acid, the polymers of N-($\alpha$-methyl-ar-vinylbenzyl)-iminodiacetic acid, N-($\alpha$-methyl-ar-vinylbenzyl)aspartic acid, N-(ar-vinylbenzyl)-$\alpha$, $\alpha'$-iminodiproprionic acid, and N-methyl-N-(ar-vinylbenzyl)aspartic acid are used to extract cobalt, copper and nickel from ammoniacal process solutions.

Cobalt, copper and nickel values are loaded on a chelate exchange resin by passing the process solution through a permeable bed of a solid chelate exchange resin. As the ammoniacal solution flows through the bed, substantially all of the cobaltous, nickel and copper values are sequestered by the resin.

When the chelate exchange resins have been loaded substantially to capacity, i.e., between about 50% and about 100% of their capacity, the flow of the ammoniacal solution through the bed is terminated or is diverted to a second bed of the chelate exchange resin in order to make the process semicontinuous. Cobalt, copper and nickel values are stripped from a loaded chelate exchange resin by passing an aqueous solution of a mineral acid through the bed. Mineral acids that can be employed include sulfuric acid and hydrochloric acid. Advantageously, an aqueous solution has an acid concentration between about 1 normal (N) and about 4 N in order to provide good stripping action and to produce solutions concentrated in the nickel and cobalt values.

Continual use of chelate exchange resins for a year or more can result in a loss of the capacity of thirty percent or more, depending upon the oxidizing strengths of the process and stripping solutions. Heretofore, in order to maintain the efficiency of the process it was necessary to replace the chelate exchange resin or to install an additional bed to increase the amount of chelate exchange resin employed. In accordance with the present invention, when the capacity of the chelate exchange resin falls below a predetermined level, e.g., between about 40 and about 70% of the original capacity, the degraded chelate exchange resin is treated to restore up to about 75% of the lost capacity.

When the capacity of the chelate exchange resin falls below the predetermined value, the resin is treated with an aqueous solution of a water-soluble halo salt of a carboxylic acid to restore its capacity to substantially that of the original material. In restoring the original capacity of the chelate exchange resin, a chelate exchange resin is first stripped of its metal values by treatment with an aqueous mineral acid. Thereafter, a aqueous solution of a halo salt of a carboxylic acid is flowed through the bed whereby the halo salt of the carboxylic acid reacts with the degraded chelate exchange resin to restore its capacity. The solution of the halo salt of the carboxylic acid is advantageously maintained at a pH value of above about 8 and advantageously at a pH value between about 8 and about 10. The halo salt of the carboxylic acid can be added as such or can be formed in situ by adding the appropriate organic acid and an alkali metal base.

Restoration of the capacity of the chelate exchange resin can be conducted at any convenient temperature from room temperature to the boiling point of the aqueous solution containing the halo salt of the carboxylic acid. Advantageously, the restoration process is conducted at a temperature between about 55° and about 75° C.

Examples of halo salts of carboxylic acids that can be employed include sodium chloroacetate, potassium chloroacetate, sodium chloropropionate and potassium chloropropionate. The halo salt is added in amounts related to the loss of loading capacity. An excess of the stoichiometric amount required is used. For example, 1 pound of monochloroacetate is used for each 0.1 pound per cubic feet of lost loading capacity — 3 times the stoichiometric amount required. After the reaction between the halo salt of the carboxylic acid and the degraded chelate exchange resin is completed, the salt solution is removed, the restored chelate exchange resin is washed with water and stripped with sulfuric acid. The stripped chelate exchange resin is advantageously retreated with the halo salt and washed with water before being recycled to the loading operation.

In order to give those skilled in the art a better appreciation of the advantages flowing from the present invention, the following illustrative example is given:

EXAMPLE 1

A sample of a iminodiacetate chelate exchange resin (sold under the trade name Amberlite XE-318) was obtained from an operating plant. The loading capacity of the resin was determined from a sulfuric acid stripping solution as being 1.4 lbs. nickel per cubic foot (H + form). This compares with 2.43 lbs. nickel per cubic foot for fresh resin. A water slurry was formed with the resin to which was added 5 grams of monochloroacetic acid followed by 6 grams of sodium carbonate. This mixture was heated to 70° and maintained at this temperature for five hours with 4.6 more grams of sodium carbonate being added to control the pH of the slurry between about 8.3 and 8.7. After a water wash, the resin was reloaded to capacity with the same feed solution used before the monochloroacetic acid treatment. The loaded resin was stripped with sulfuric acid. Analysis of the bulk eluate showed that the loading capacity had been restored to 2.16 lbs. nickel per cubic foot (H + form)—74% of the lost capacity was restored.

Although the present invention has been described in conjunction with the preferred embodiments, it is to be understood that modifications and variations may be resorted to without departing from the principles and scope of the invention that those skilled in the art will readily understand. Such modifications and variations are considered to be within the purview and scope of the invention under the appended claims.

I claim:

1. A process for removing at least one metal value selected from the group consisting of nickel, cobalt and copper from ammoniacal solutions which comprises contacting the ammoniacal solution with a chelate exchange resin of a polymeric ar-vinylbenzylamino dicarboxylic acid to load the resin with the metal value, stripping the metal value from the loaded resin with an aqueous solution of a mineral acid, recycling the stripped resin to load further quantities of the metal value on the resin and contacting the stripped resin with an alkaline aqueous solution of a halo salt of at least one water-soluble carboxylic acid at a pH value greater than about 8 to restore the resin to substantially its original value when the capacity of the resin falls below a predetermined value.

2. The process as described in claim 1 wherein the chelate exchange resin has a polymeric matrix.

3. The process as described in claim 2 wherein the chelate exchange resin has the structured formula:

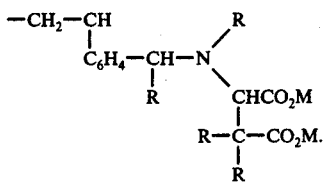

4. The process as described in claim 2 wherein the chelate exchange resin has the structured formula:

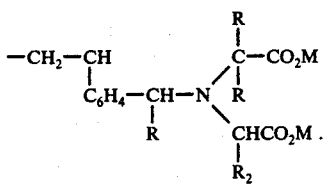

5. The process as described in claim 1 wherein the loaded resin is stripped with an aqueous solution of a mineral acid having a concentration between about 1 N and about 4 N.

6. The process as described in claim 1 wherein the chelate exchange resin is treated with the halo salt of carboxylic acid when the capacity of the resin falls to between about 40 and about 70% of its original capacity.

7. The process as described in claim 1 wherein the aqueous solution of the halo salt of the carboxylic acid is maintained at a pH value between about 8 and about 10.

8. The process as described in claim 1 wherein the chelate exchange resin and the aqueous solution of the salt of a carboxylic acid are maintained at a temperature between about 55° and about 75° C during the restoration treatment.

9. The process as described in claim 1 wherein the halo salt of a carboxylic acid is sodium chloracetate.

* * * * *